United States Patent
Biller et al.

(10) Patent No.: US 10,179,565 B2
(45) Date of Patent: Jan. 15, 2019

(54) FORCE LIMITING DEVICE AND METHOD FOR CONTROLLING A FORCE LIMITING DEVICE

(71) Applicant: TRW Automotive GmbH, Alfdorf (DE)

(72) Inventors: Joachim Biller, Lorch (DE); Hans-Peter Bausch, Alfdorf (DE)

(73) Assignee: TRW Automotive GmbH (DE)

( * ) Notice: Subject to any disclaimer, the term of this patent is extended or adjusted under 35 U.S.C. 154(b) by 571 days.

(21) Appl. No.: 14/651,251

(22) PCT Filed: Dec. 11, 2013

(86) PCT No.: PCT/EP2013/003741
§ 371 (c)(1),
(2) Date: Jun. 11, 2015

(87) PCT Pub. No.: WO2014/090401
PCT Pub. Date: Jun. 19, 2014

(65) Prior Publication Data
US 2015/0329076 A1    Nov. 19, 2015

(30) Foreign Application Priority Data

Dec. 12, 2012  (DE) .................. 10 2012 024 270

(51) Int. Cl.
*B60R 22/42*    (2006.01)
*B60R 22/343*   (2006.01)
(Continued)

(52) U.S. Cl.
CPC .............. *B60R 22/42* (2013.01); *B60R 22/28* (2013.01); *B60R 22/341* (2013.01);
(Continued)

(58) Field of Classification Search
CPC . B60R 22/341; B60R 22/28; B60R 2022/282; B60R 2022/288;
(Continued)

(56) References Cited

U.S. PATENT DOCUMENTS 8,418,819 B2 *   4/2013   Battlogg ................ B60R 22/28
                                                   137/807
2002/0084633 A1   7/2002   Heigl et al.
(Continued)

FOREIGN PATENT DOCUMENTS

| DE | 20018091   | 4/2001 |
|----|------------|--------|
| DE | 102010024420 | 2/2011 |
| WO | 2010020422 | 2/2010 |

*Primary Examiner* — Paul N Dickson
*Assistant Examiner* — Joselynn Y Sliteris
(74) *Attorney, Agent, or Firm* — Tarolli, Sundheim, Covell & Tummino LLP

(57) ABSTRACT

In a load limiting device (10), especially for a seat belt in a vehicle, comprising a controllable braking device (16) which has a fluid-filled compartment (24) including a conduit (34) through which the fluid (23) can flow, an element to be decelerated (32) which is coupled to the seat belt, at least one sensor (18) for detecting vehicle operating data, especially an acceleration sensor, a sensor (20) for detecting the webbing extension, and a controller (22) for controlling the braking power of the braking device (16) as a function of the vehicle operating data measured and the webbing extension measured, the fluid (23) is a magnetorheological fluid and a control magnet is provided which is adapted to generate a variable magnetic field inside the conduit (34) and to vary the viscosity of the magnetorheological fluid inside the conduit (34).

15 Claims, 7 Drawing Sheets

Figure 1:
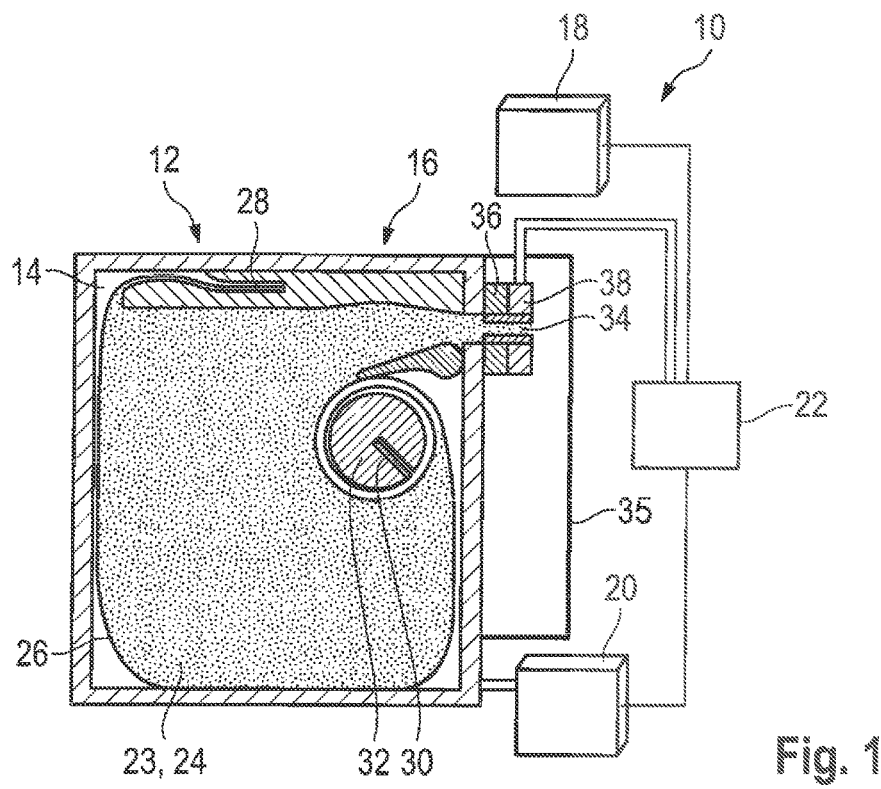

(51) Int. Cl.
*B60R 22/40* (2006.01)
*B60R 22/48* (2006.01)
*B60R 22/28* (2006.01)
*B60R 22/34* (2006.01)

(52) U.S. Cl.
CPC ............ *B60R 22/343* (2013.01); *B60R 22/40* (2013.01); *B60R 22/48* (2013.01); *B60R 2022/282* (2013.01); *B60R 2022/284* (2013.01); *B60R 2022/288* (2013.01); *B60R 2022/4808* (2013.01)

(58) Field of Classification Search
CPC . B60R 2022/284; B60R 22/42; B60R 22/343; B60R 22/40; B60R 22/48; B60R 2022/4808
See application file for complete search history.

(56) References Cited

U.S. PATENT DOCUMENTS

| | | | |
|---|---|---|---|
| 2005/0082410 A1* | 4/2005 | Tanaka | B60R 22/44 242/390.8 |
| 2005/0098997 A1* | 5/2005 | Tanaka | B60R 22/44 280/807 |
| 2006/0022077 A1* | 2/2006 | Hiramatsu | B60R 22/3413 242/381 |
| 2006/0022078 A1* | 2/2006 | Kitazawa | B60R 22/3413 242/382 |
| 2010/0007125 A1 | 1/2010 | Jessup et al. | |

\* cited by examiner

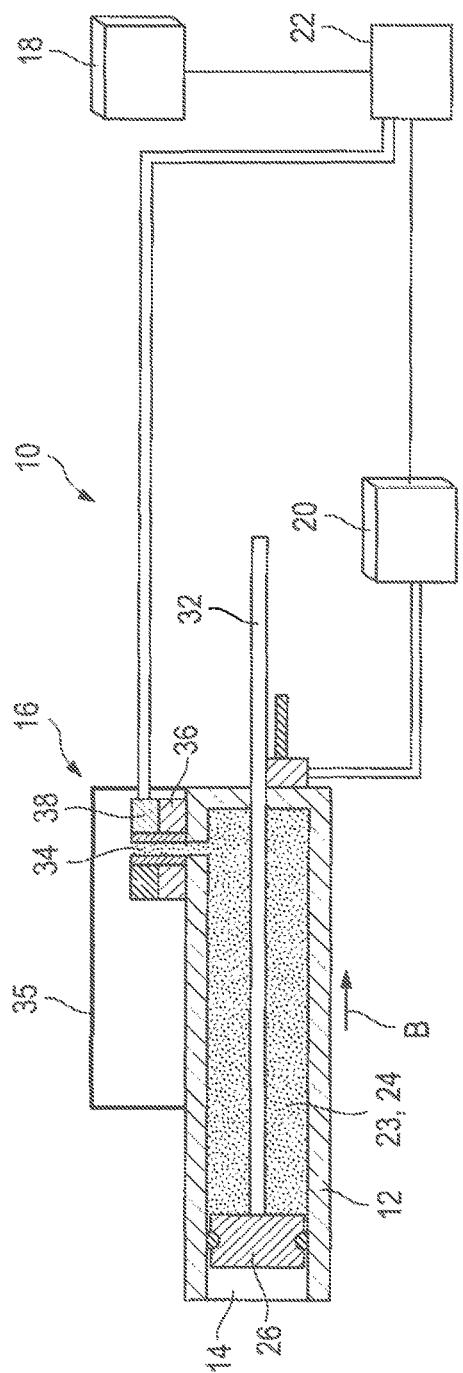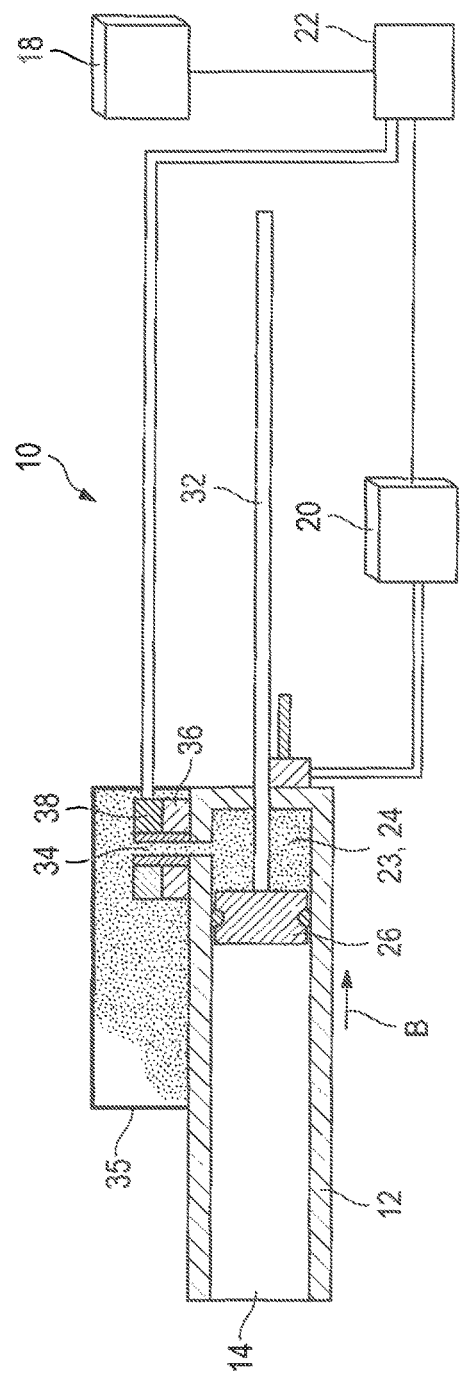

FORCE LIMITING DEVICE AND METHOD FOR CONTROLLING A FORCE LIMITING DEVICE

RELATED APPLICATIONS

This application corresponds to PCT/EP2013/003741, filed Dec. 11, 2013, which claims the benefit of German Application No. 10 2012 024 270.0, filed Dec. 12, 2012, the subject matter, of which are incorporated herein by reference in their entirety.

BACKGROUND OF THE INVENTION

The invention relates to a load limiting device, especially for a seat belt in a vehicle. The invention moreover relates to a method of controlling such load limiting device.

Load limiting devices permit limited extension of the belt webbing when the seat belt blocks so as to reduce the load on the vehicle occupant. Such load limiting device includes braking means which regulates the webbing extension via the element to be decelerated. From the state of the art braking means are known comprising a fluid-filled compartment including a conduit through which the fluid is allowed to flow. In or at the fluid-filled compartment a displacing element is arranged which is coupled to the seat belt via an element to be decelerated and upon blocking of the seat belt or release of the load limiting device is moved inside the fluid-filled compartment so that the fluid flows through the conduit.

By adjusting the fluid quantify flowing through the conduit and, resp., the flow rate in the conduit the resistance counteracting a movement of the displacing element and thus the level of load limitation and, resp., of webbing extension can be adjusted.

In order to achieve highly exact adaptation of the load limiting device e.g. to the weight of the vehicle occupant or the intensity of deceleration, such bad limiting devices include sensors for detecting vehicle operating data, for example of the acceleration of the vehicle, and for detecting the webbing extension as well as a controller. The controller allows controlling the extension of the webbing as a function of the measured data so that the range available for load limitation is perfectly exploited and the load on the vehicle occupant is minimized. In order to ensure most exact control of the braking device it is required to regulate the flow through the conduit as accurately as possible.

SUMMARY OF THE INVENTION

It is the object of the invention to provide a load limiting device of the afore-mentioned type including a reliable accurately controllable braking device. It is furthermore the object of the invention to provide a method of controlling such load limiting device.

In order to achieve the object it is provided in a load limiting device, especially for a seat belt in a vehicle, comprising a controllable braking device having a fluid-filled compartment including a conduit through which the fluid can flow, an element to be decelerated which is coupled to the seat belt, at least one sensor for detecting vehicle operating data, especially an acceleration sensor, a sensor for detecting the webbing extension and a controller for controlling the braking power of the braking device as a function of the vehicle operating data measured and the webbing extension measured that the fluid is a magnetorheological fluid and a control magnet is provided which is capable of generating a variable magnetic field in the conduit and of varying the viscosity of the magnetorheological fluid in the conduit. In the previously known load limiting devious the flow through the conduit is controlled by mechanical measures, for example a variable constriction of cross-section or by a mechanical valve in the conduit For this purpose, movable parts are required in the conduit, however. By using a magnet for varying the viscosity of the fluid in the conduit it is possible to control the flow without additional movable parts having to be arranged in the fluid and, resp., in the conduit. By continuous adaptation of the magnetic field further an exact regulation of the braking device and thus of the load limiting device is possible. Since no movable parts are provided in the conduit, a maintenance-free reliable possibility of controlling the bad limiting device is provided.

The variable magnetic field can be generated in the conduit in different ways. In a first embodiment, the control magnet is a solenoid adapted to be switched on or off by the controller and to generate a variable magnetic field in the conduit. In this embodiment, the control magnet is fixedly installed and the magnetic field is set by varying the current intensity applied to the solenoid, thus causing the intensity of the magnetic field to be adapted at will.

The control magnet may also be a movable permanent magnet, however, which can be displaced relative to the conduit. The magnetic field is varied inside the conduit by the distance of the control magnet from the conduit. In this embodiment, the permanent magnet can especially be moved as a function of acceleration, for example by strong deceleration.

In all embodiments a further permanent magnet can be provided at or in the conduit, the magnetic field thereof extending in the opposite or the same direction relative to the magnetic field of the control magnet. That is to say, the control magnet attenuates the magnetic field generated by the permanent magnet in the conduit or else intensifies the same. For example, in the conduit such strong magnetic field can be generated by the permanent magnet that the viscosity of the magnetorheological fluid in the conduit is so high that it cannot flow or can only flow through the conduit at a high resistance. The resulting magnetic field is attenuated by the opposed control magnet so that the viscosity of the magnetorheological fluid is reduced to such extent that it can flow in the conduit. In the case of power failure, the load limiting device is thus blocked or set to a very high level so that excessive webbing extension is safely prevented in the case of power failure or failure of the control magnet.

The braking device can include a displacing element, for example, which is coupled to the element to be decelerated and forces the fluid through the conduit in the case of movement of the element to be decelerated.

This displacing element can be a metal sheet tor example, and the element to be decelerated can be a shaft onto which the metal sheet can be wound. The shaft may be coupled to a belt retractor or a belt reel, for instance. Preferably the metal sheet is arranged so that it reduces the volume in the fluid-filled compartment upon winding onto the shaft so that the fluid is forced through the conduit out of the fluid-filled compartment. Such embodiment is preferably suited for a belt retractor in which the shaft is adapted to be coupled to the belt reel or any other rotating component of the belt retractor.

In another embodiment the displacing element is a piston and the element to be decelerated is a plunger on which the piston is retained. The displacing element is linearly moved in this embodiment.

The displacing element can also be moved by the fluid, with the conduit being formed between an inner wall of the fluid-filled compartment and the displacing element, i.e. provided in the fluid-filled compartment.

Preferably additional sensors for detecting vehicle-specific data are provided so that the control of the braking device can be based on various factors.

In addition, for achieving the object a method of controlling a load limiting device, especially for a seat belt in a vehicle, is provided comprising a controllable braking device, an element to be decelerated which is coupled to the seat belt, at least one sensor for detecting vehicle operating data, especially an acceleration sensor, and comprising a sensor for detecting the webbing extension. In accordance with the invention, the braking power is set as a function of the vehicle operating data and the webbing extension so that the maximum webbing extension and/or the webbing extension rate is dependent exclusively on the vehicle operating data. That is to say that the braking device is adjusted independently of weight. It is adjusted so that for all vehicle occupants the maximum available range for load limitation can be exploited so that the load on the vehicle occupant can be largely reduced.

The vehicle operating data are acceleration data, for example. The maximum webbing extension and/or the webbing extension rate are determined as a function of the acceleration data so that they can be adjusted to the respective deceleration of the vehicle.

Preferably the acceleration must exceed a defined limit for the vehicle acceleration which is especially dependent on the vehicle speed or other vehicle operating data so that in the case of low decelerations the load limiting device is not triggered.

BRIF DESCRIPTION OF THE DRAWINGS

Figure 2:
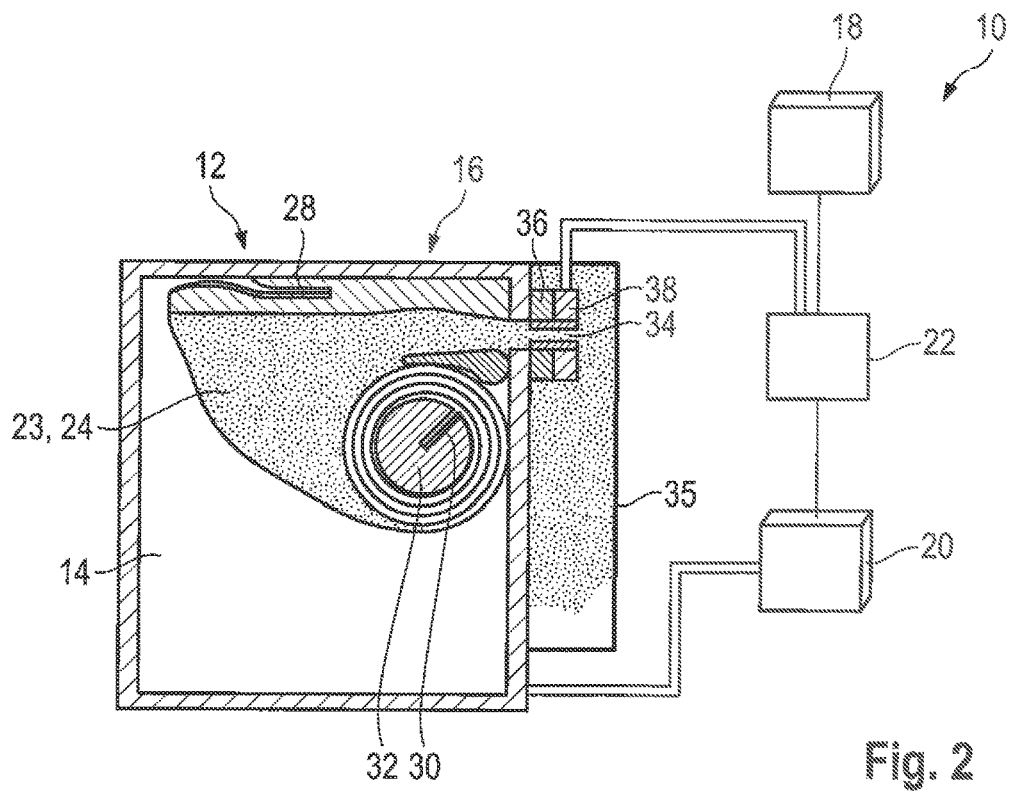
Figure 3:
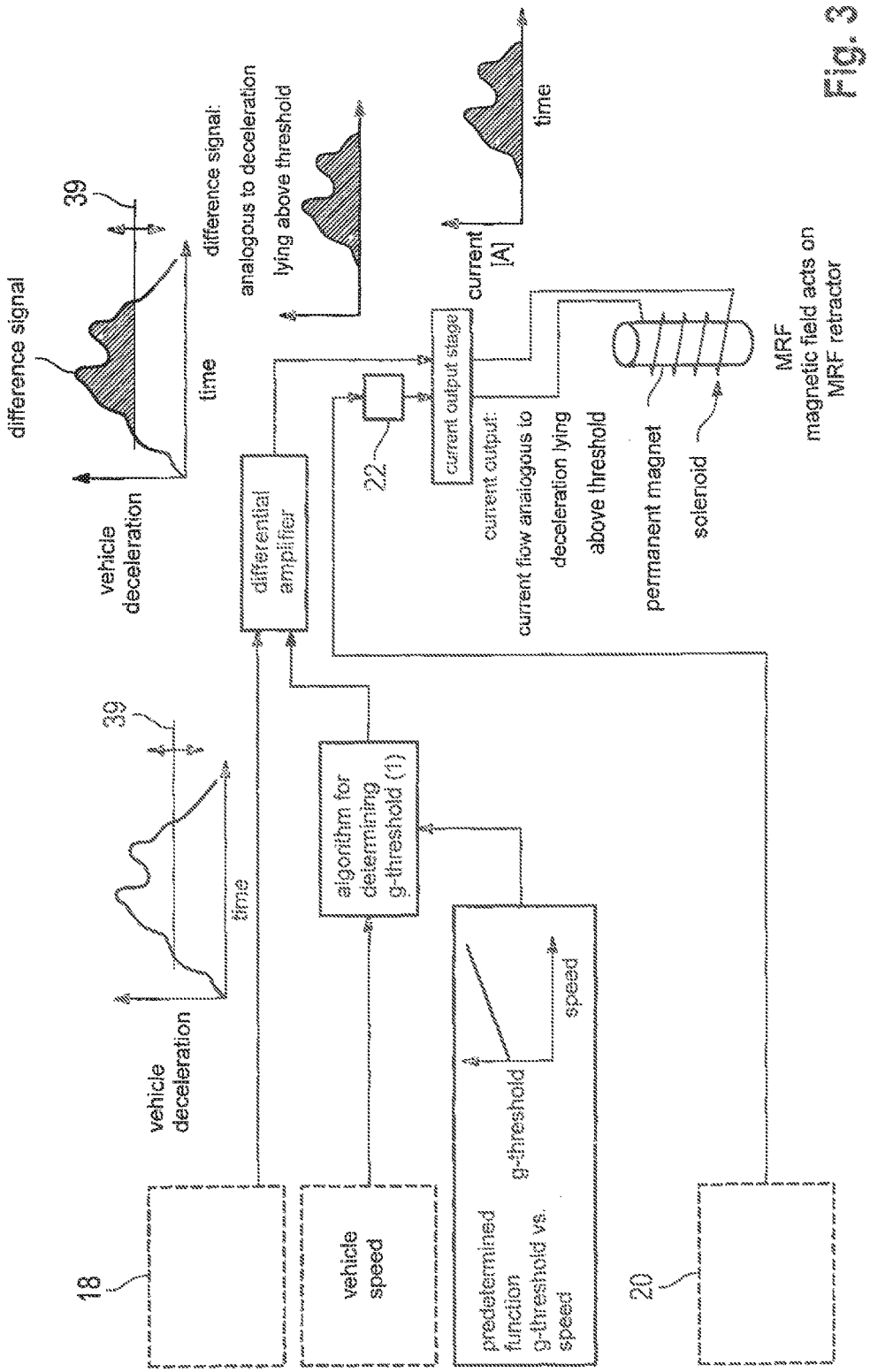
Figure 6:
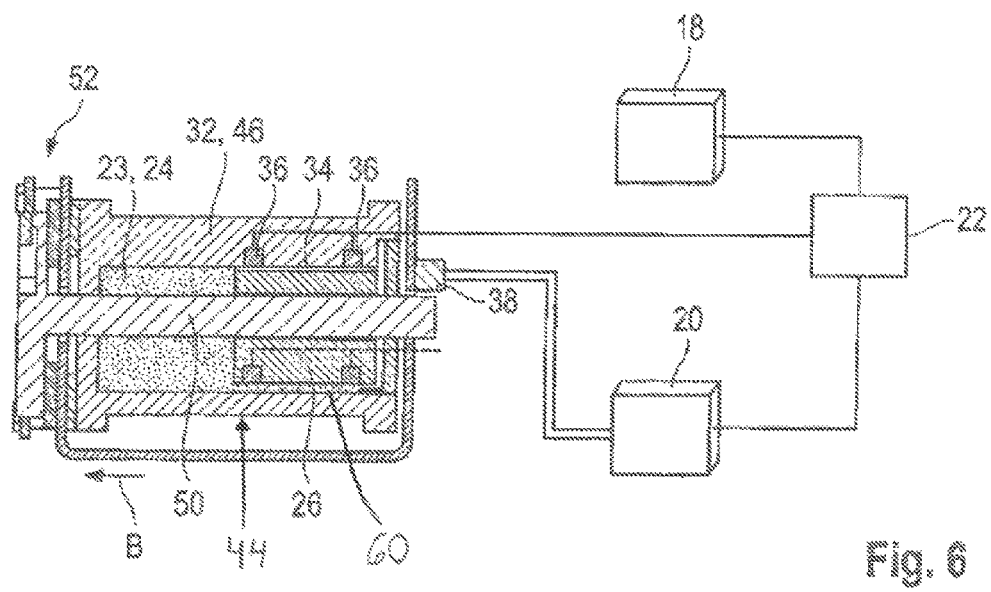
Figure 7:
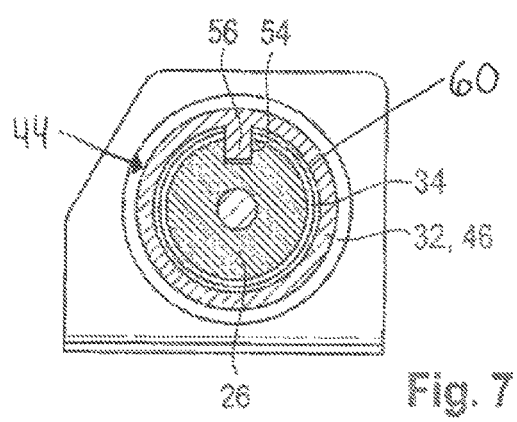
Figure 8:
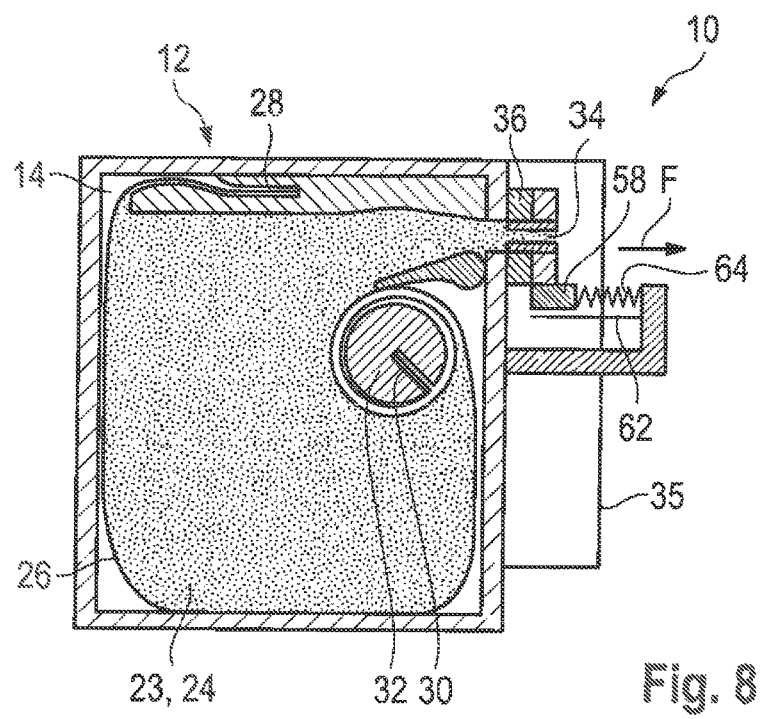
Figure 9:
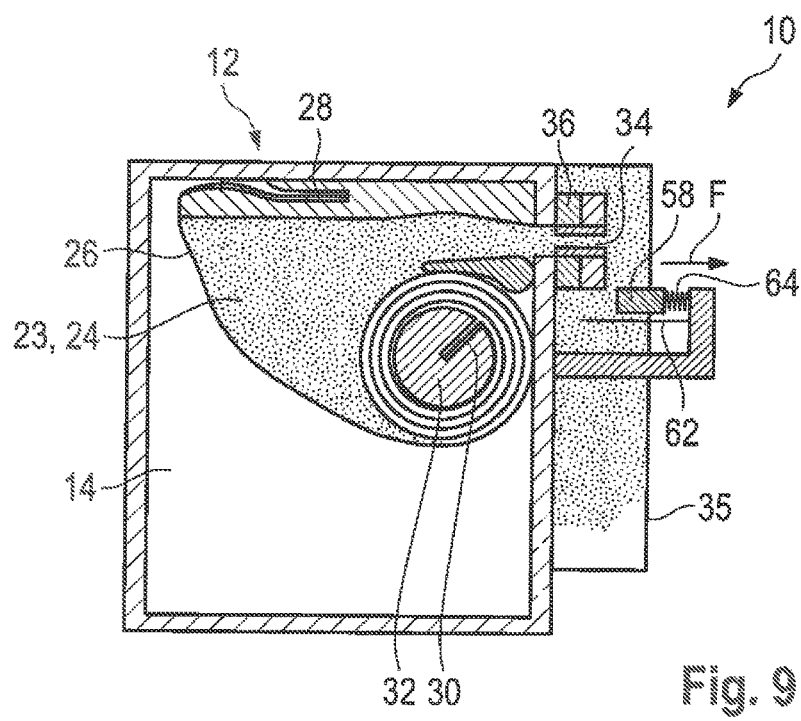
Figure 10:
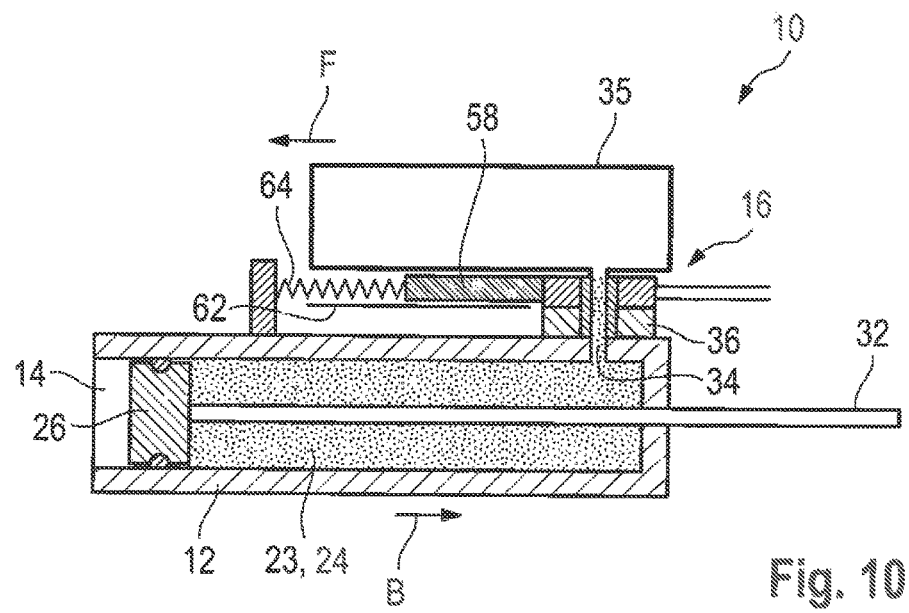
Figure 11:
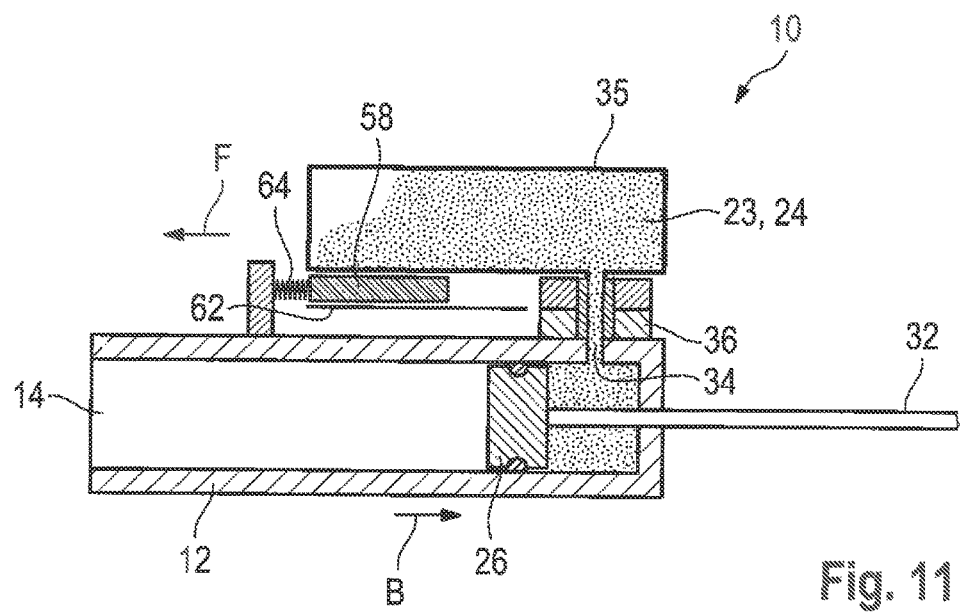
Figure 12:
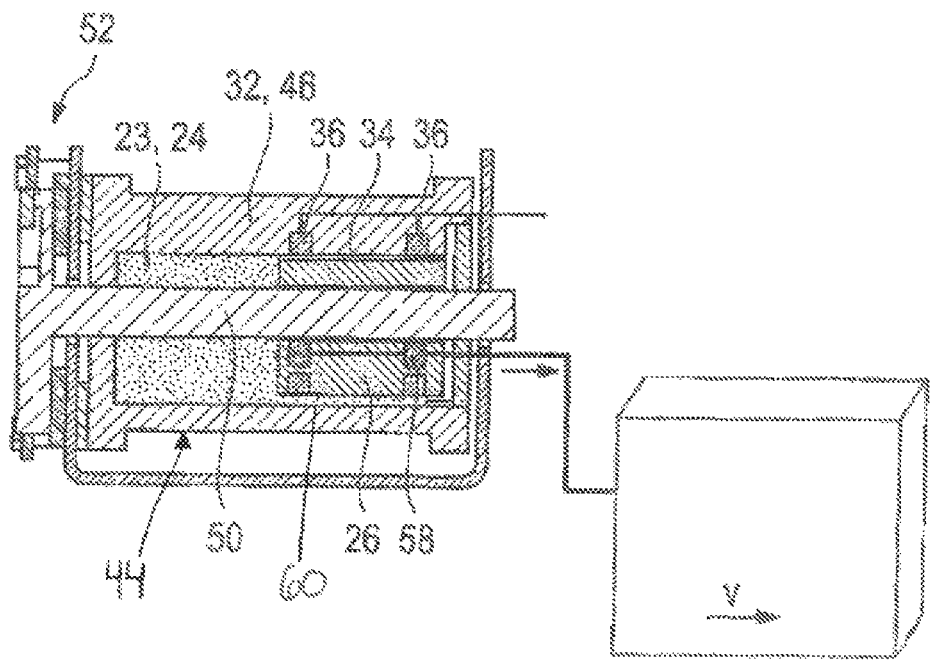
Figure 13:
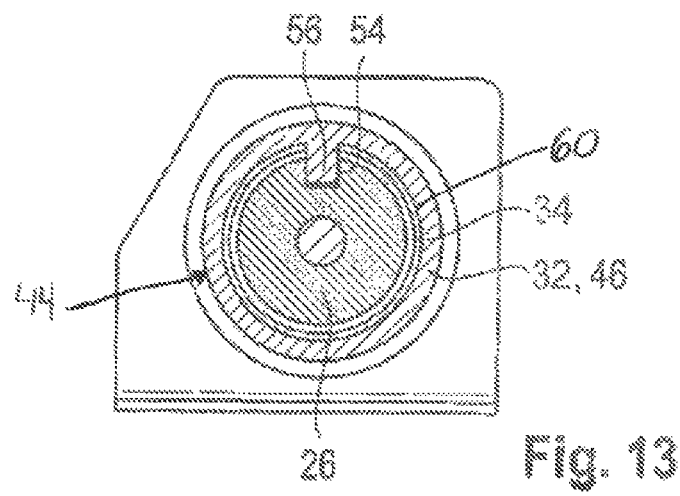

Further advantages and features are resulting from the following description in combination with the enclosed drawings, in which:

FIG. 1 shows a first embodiment of a load limiting device according to the invention in the non-activated state, FIG. 2 shows the load limiting device from FIG. 1 in the activated state, FIG. 3 shows a schematic of the control of the load limiting device according to the invention, FIG. 4 shows a second embodiment of a load limiting device according to the invention in the non-activated state, FIG. 5 shows the load limiting device from FIG. 4 in the activated state, FIG. 6 shows a third embodiment of a load limiting device according to the invention in the non-activated state, FIG. 7 shows a sectional view across the load limiting device from FIG. 6, FIG. 8 shows a fourth embodiment of a load limiting device according to the invention in the non-activated state, FIG. 9 shows the load limiting device from FIG. 8 in the activated state, FIG. 10 shows a fifth embodiment of a load limiting device according to the invention in the non-activated state, FIG. 11 shows the load limiting device from FIG. 10 in the activated state, FIG. 12 shows a sixth embodiment of a load limiting device according to the invention, and FIG. 13 shows a sectional view across the load limiting device fern FIG. 12.

DESCRIPTION OF EMBODIMENTS

In FIGS. 1 and 2 a first embodiment of a load limiting device 10 for a seat belt in a vehicle is illustrated. The load limiting device 10 comprises a casing 12 including a compartment 14 in which a braking device 16 is arranged as well as a first sensor 18 for detecting vehicle operating data, for example the acceleration of the vehicle, and a second sensor 20 adapted to detect a webbing extension. Both sensors are connected to a controller 22.

The braking device 16 comprises a compartment 24 filled with a magnetorheological fluid 23 and confined by a displacing element 26 in the form of a metal sheet which is fastened by one retaining end 28 to the casing 12 and by a second end 30 to an element to be decelerated 32 being configured as a shaft in this embodiment. The shaft is coupled to the belt reel or any other component of the seat belt so that regarding FIG. 1 the shaft is rotated anti-clockwise during webbing extension.

The braking device 16 further includes a conduit 34 provided at the casing 12 and being fluid-communicated with the fluid-filled compartment 24 as well as a collecting vessel 35 which is fluid-communicated with the conduit 34, When the shaft is rotated anti-clockwise during webbing extension, the metal sheet is wound onto the shaft so that the volume of the fluid-filled compartment 24 is reduced. The fluid 23 is forced cut of the compartment 24 through the conduit 34 into the collecting vessel 35 by the reduction of volume. When the flow rate of the fluid 23 through the conduit 34 is reduced so that the fluid 23 cannot flow out of the compartment 24 at the required velocity, tensile stress is exerted on the metal sheet by the pressure increasing in the fluid-filled compartment 24, This tensile stress counteracts the rotation of the shaft anti-clockwise, causing the webbing extension to be decelerated and, resp., stopped.

For controlling the flow rate through the conduit a permanent magnet 36 as well as a solenoid 38 being coupled to the controller 22 and constituting a control magnet are provided at the conduit 34. The permanent magnet 36 permanently generates in the conduit 34 a magnetic field by which the viscosity of the magneto-rheological fluid 23 is increased so that the fluid 23 cannot flow or can flow through the conduit 34 only while overcoming high resistance. Since the magnetorheological fluid 23 cannot flow out of the fluid-filled compartment 24, the shaft cannot be rotated or can only be rotated against high resistance. Hence the load limiting device 10 is adjusted to a high load limiting level at which only minimum webbing extension is possible.

The solenoid 38 is arranged in this embodiment so that the magnetic field of the switched-on solenoid 38 is aligned opposed to the magnetic field of the permanent magnet 36. When the solenoid 38 is switched on, the resulting magnetic field in the conduit 34 acting on the magnetorheological fluid 23 is reduced so that the viscosity of the magnetorheological fluid 23 is reduced and the latter can flow through the conduit 34 at a tower resistance into the collecting vessel 35 (FIG. 2).

As a function of the current intensity applied to the solenoid 38 and the magnetic field of the solenoid 38 generated in this way, the resulting magnetic field in the conduit and thus the viscosity of the fluid 23 in the conduit 34 can be set at will, thus allowing the braking power of the braking device 16 to be freely adjusted.

A method of controlling said load limiting device 10 is schematically illustrated in FIG. 3.

The measured values of the sensor 18 for detecting vehicle operating data, in this case the deceleration values of the vehicle, are transmitted to the controller 22. Depending on the vehicle speed, a threshold 39 is fixed below which the deceleration values of the vehicle are not taken into account, hence the load limiting device 10 is not adjusted, as in the case of said acceleration values no response of the load limiting device 10 is required. Based on the values of the acceleration above said threshold 39 a difference signal is formed which is transmitted via a differential amplifier to the current output stage driving the solenoid 38 analogously to the deceleration being above the threshold 39 so that the braking device 16 can be set corresponding to the vehicle deceleration.

The braking device 16 is set in this case only dependent on the vehicle deceleration and not dependent on the weight of the vehicle occupant so that the deceleration values and, resp., the load limiting values are equal for all vehicle occupants. Independently of the vehicle occupant, this permits ideal exploitation of the webbing extension available for load limitation.

In addition, the webbing extension can be measured by the sensor 20 so that exceeding of the maximum webbing extension and, resp., exceeding of the maximum webbing extension rate can be prevented.

In this first embodiment, the element to be decelerated 32 is a shaft which may be coupled to a rotating component of the seat belt, for example the belt reel. FIGS. 4 and 5 illustrate a second embodiment in which the displacing element 26 is a piston which can be linearly displaced in an elongate fluid-filled compartment 24 and which closes and, resp., seals the fluid-filled compartment 24. A plunger which constitutes the element to be decelerated 32 and may be coupled to a belt fitting of the seat belt, for example, is mounted on the piston. The other components correspond to the embodiment illustrated in FIGS. 1 and 2.

For load limitation the plunger and, resp., the piston is moved in an operating direction B in the fluid-filled compartment 24. The fluid is forced through the conduit 34 out of the compartment 24, the viscosity of the magnetorheological fluid 23 being adjusted by the permanent magnet 36 and the solenoid 38 in this embodiment, too.

In both embodiments the magnetic field of the permanent magnet 36 is attenuated by the control magnet in the form of solenoid 38 so that the magnetorheological fluid 23 has a lower viscosity and can flow through the conduit 34 with lower resistance. This offers the advantage that in the case of power failure or failure of the controller 22 a magnetic field generating high viscosity of the magnetorheological fluid 23 is provided by the permanent magnet 36 so that a high load limiting level is given.

However, also embodiments exhibiting no permanent magnet are imaginable in which a control magnet generates a permanent magnetic field that is reduced as a function of speed or deceleration. The magnetic field of the control magnet can also be aligned in the same direction as the magnetic field of the permanent magnet 36.

A third embodiment of a load limiter 10 according to the invention is illustrated in FIGS. 6 and 7. In this embodiment the fluid-filled compartment 24 is provided inside a belt reel 44. The element to be decelerated 32 is constituted by the base member 46 of the belt reel 44 in this case. The displacing element 26 is coupled to a shaft 50 which can be held in a rotationally fixed manner by a blocking means 52, wherein when the displacing element 26 is rotated relative to the shaft 50 the displacing element 26 is moved in an actuating direction B.

The displacing element 26 is coupled to the base member 46 of the belt reel 44 via a guide 54, 56 in a rotationally fixed manner. The diameter of the displacing element 26 is slightly smaller than the diameter of the fluid-filled compartment 24 so that a conduit 34 is formed between the displacing element 26 and the inner wall 60 of the fluid-filled compartment 24. However, recesses forming conduits 34 may also be formed at the displacing member 26 or at the base member 46.

When the belt reel 44 is rotated with a high pull-off force, the displacing element 26 is moved in the actuating direction B through the fluid-filled compartment 24, wherein the fluid 23 flows through the conduits 34 passing by the displacing element 32. The solenoid 38 is arranged at the base member 46 of the belt reel 44 in this case so that it generates a magnetic field in the conduits 34 by which the viscosity in the conduits 34 is increased.

In all three embodiments the viscosity of the magnetorheological fluid 23 is controlled in the conduits via a control magnet in the form of solenoid 38 which is switched on and/or off by a controller 22, the magnetic field of the solenoid 38 being adapted to be continuously adjusted.

The viscosity is adjusted exclusively as a function of the vehicle operating data measured so that in defined operating states, for example deceleration of the vehicle, load limitation and thus limited webbing extension takes place, but in the case of specific different operating states, for example in the case of vehicle rollover, no webbing extension takes place, thus allowing the load limitation and the webbing extension to be perfectly adapted to the particular state of the vehicle.

Deviating from the previously illustrated embodiments, it is also imaginable, however, that the magnetic field is controlled exclusively mechanically, wherein no moving parts are arranged in the conduit 34.

Such load limiting device 10 is shown in FIGS. 8 and 9, for example. The load limiting device 10 substantially corresponds to the load limiting device 10 illustrated in FIGS. 1 and 2. Deviating herefrom, in this embodiment the control magnet is not a solenoid but a second permanent magnet 58 which is movably supported in a support 62 in the driving direction F. A spring 64 which loads the permanent magnet 58 against the driving direction F is provided at the support 62. In this position the permanent magnet 58 is adjacent to the conduit 34 so that a strong magnetic field is generated in the conduit and the viscosity of the fluid 23 in the conduit 34 is increased, i.e. a high load limiting level is given.

If the vehicle experiences strong deceleration, the permanent magnet 58 is moved in the driving direction F, wherein the spring 64 is upset (FIG. 9). In this way the permanent magnet 58 is moved away from the conduit 34 so that the magnetic field in the conduit 34 is attenuated and the viscosity of the fluid 23 in the conduit 34 is reduced and the fluid 23 can flow out of the compartment 24 with lower resistance, i.e. a lower load limiting level is provided. The control magnet is supported in said embodiment such that it is only displaced in the case of deceleration in the longitudinal vehicle direction.

A second embodiment of such mechanical control is illustrated in FIGS. 10 and 11. The load limiting device 10 substantially corresponds to the load limiting device shown in FIGS. 4 and 5. Instead of a solenoid 38, also in this case a permanent magnet 58 movably supported in the driving direction F is provided which is moved away from the conduit 34 in the case of deceleration in the driving direction F.

In the embodiment illustrated in FIG. 12, too, the solenoid is replaced with a permanent magnet 58 adapted to be moved away from the conduit 34.

However, in these embodiments the permanent magnet 58 may also be supported so that in the case of deceleration it is moved toward the conduit 34.

The invention claimed is:

1. A load limiting device (10) for a seat belt to protect an occupant in a vehicle, comprising a controllable braking device (16) which includes a fluid-filled compartment (24) having a conduit (34) through which the fluid (23) can flow, an element to be decelerated (32) which is coupled to the seat belt, at least one sensor (18) for detecting vehicle operating data, a sensor (20) for detecting a webbing extension, and a controller (22) for controlling braking power of the braking device (16) as a function of the vehicle operating data measured and the webbing extension measured, wherein the fluid (23) is a magnetorheological fluid and a control magnet is provided which is adapted to generate a variable magnetic field inside the conduit (34) and to vary the viscosity of the magnetorheological fluid inside the conduit (34), and wherein the controller (22) adjusts the braking power independently of the weight of the occupant.

2. The load limiting device according to claim 1, wherein the control magnet is a solenoid (38) adapted to be switched on or off by the controller (22) and adapted to generate a variable magnetic field inside the conduit (34).

3. The load limiting device according to claim 1, wherein the control magnet is a movable permanent magnet (58) which can be displaced, as a function of acceleration, relative to the conduit (34).

4. The load limiting device according to claim 1, wherein at or in the conduit (34) a permanent magnet (36, 58) is provided, the magnetic field of which extends in the opposite direction or in the same direction relative to the magnetic field of the control magnet.

5. The load limiting device according to claim 1, wherein the braking device (16) includes a displacing element (26) coupled to the element to be decelerated (32) and forcing the fluid (23) out of the fluid-filled compartment (24) during movement of the element to be decelerated (32).

6. The load limiting device according to claim 5, wherein the displacing element (26) is a metal sheet and the element to be decelerated is a shaft onto which the metal sheet is at least one of wound and unwound during movement of the shaft.

7. The load limiting device according to claim 6, wherein the load limiting device further includes a casing 12 having a compartment (14) in which the breaking device (16) is arranged, the metal sheet having one end (28) fastened to the casing (12) and a second end (30) fastened to the shaft.

8. The load limiting device according to claim 5, wherein the displacing element (26) is a piston and the element to be decelerated is a plunger at which the piston is retained.

9. The load limiting device according to claim 1, wherein a displacing element (26) is provided which is moved by the fluid (23), the conduit (34) being formed between an inner wall (60) of the fluid-filled compartment (24) and the displacing element (26).

10. The load limiting device according to claim 1, wherein additional sensors for detecting vehicle-specific data are provided.

11. The load limiting device according to claim 1, wherein the at least one sensor (18) for detecting vehicle operating data includes an acceleration sensor.

12. A method of controlling a load limiting device (10) for a seat belt to protect an occupant in a vehicle, the method comprises providing a controllable braking device (16) which includes a fluid-filled compartment (24) having a conduit (24) through which the fluid (23) can flow, the fluid being a magnetorheological fluid, an element to be decelerated (32) which is coupled to the seat belt, providing at least one sensor (18) for detecting vehicle operating data, a sensor (20) for detecting a webbing extension, providing a controller (22) for controlling braking power of the braking device (16) as a function of the vehicle operating data and the webbing extension so that the maximum webbing extension and/or the webbing extension rate is/are dependent exclusively on the vehicle operating data and independently of the weight of the occupant, and providing a control magnet which is adapted to generate a variable magnetic field inside the conduit (34) and to vary the viscosity of the magnetorheological fluid inside the conduit (34).

13. The method according to claim 12, wherein the vehicle operating data are acceleration data and the maximum webbing extension and/or the webbing extension rate are determined as a function of the acceleration data.

14. The method according to claim 13, wherein the acceleration has to exceed a defined limit for the vehicle acceleration which is dependent on vehicle speed or any other vehicle operating data.

15. The load limiting device according to claim 12, wherein the at least one sensor (18) for detecting vehicle operating data includes an acceleration sensor.

* * * * *